UNITED STATES PATENT OFFICE.

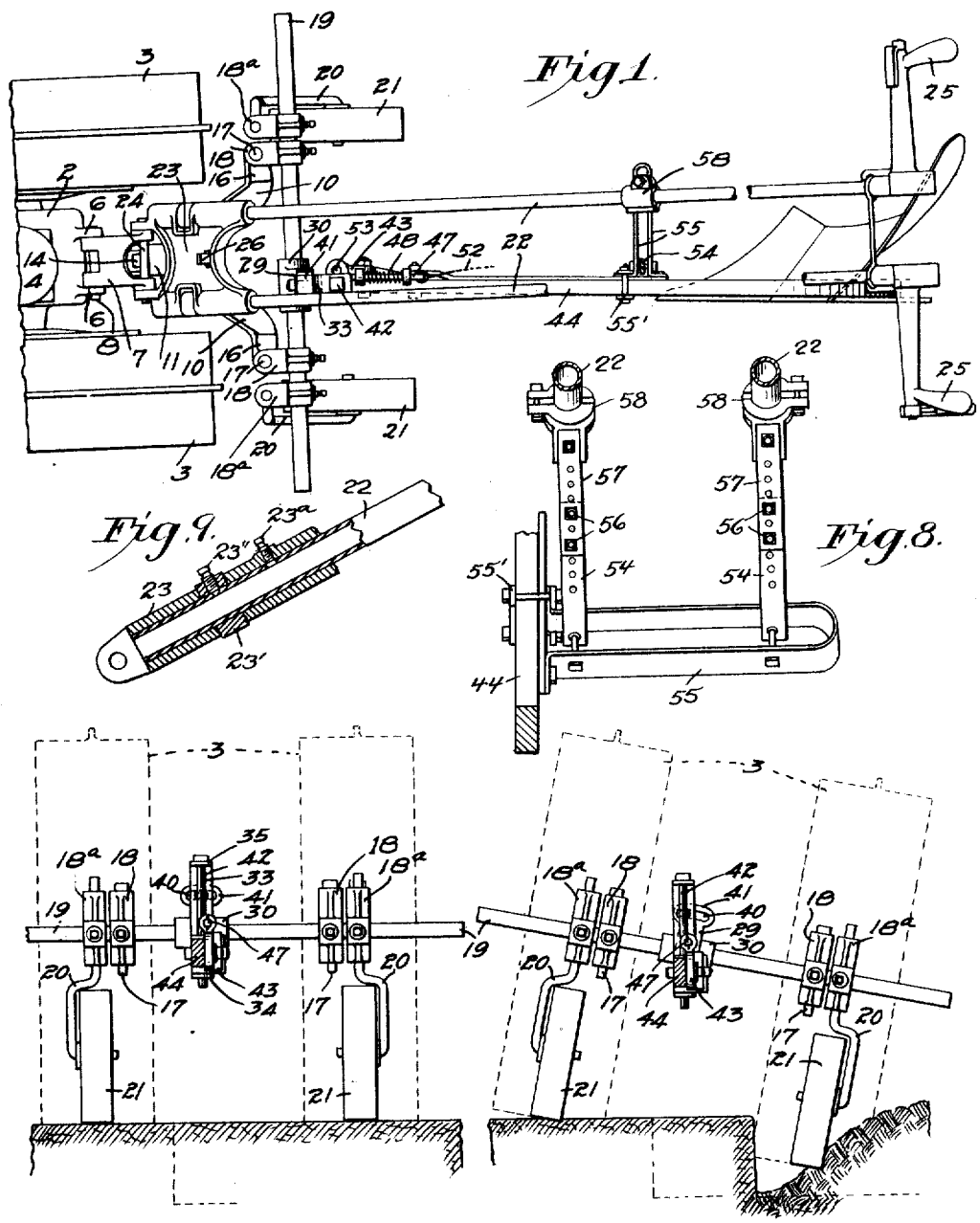

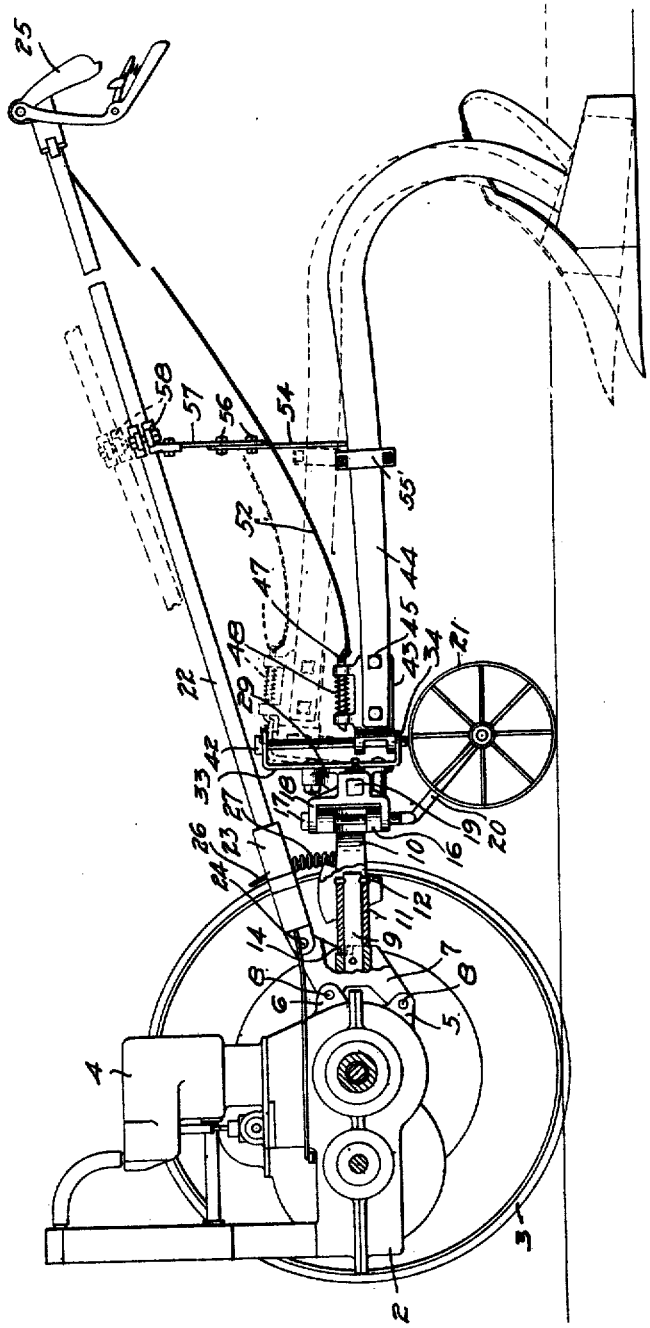

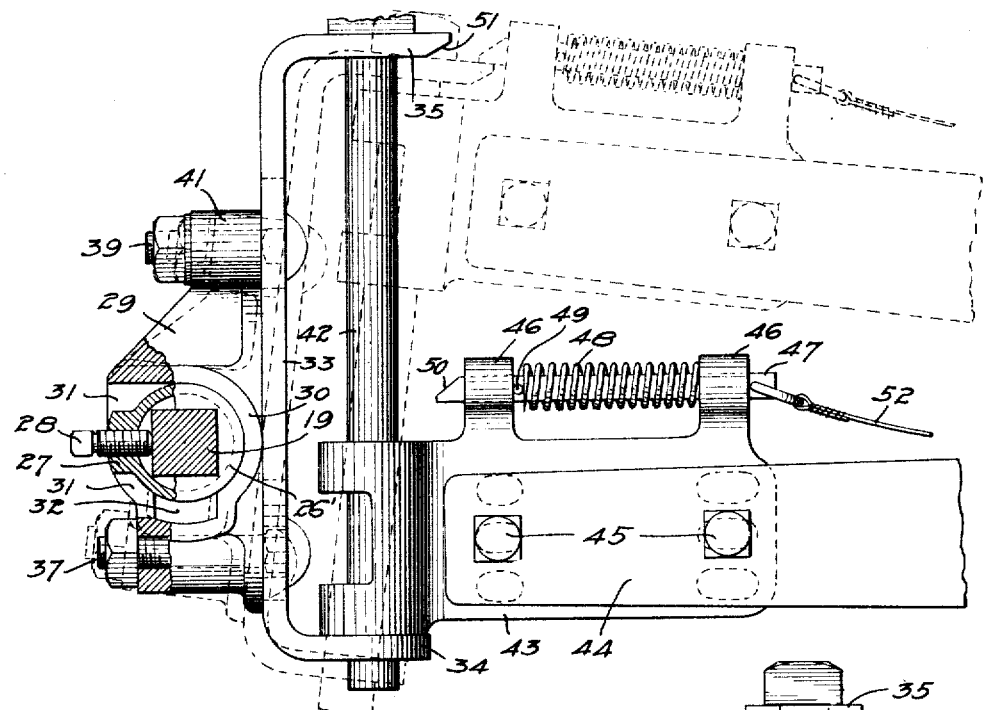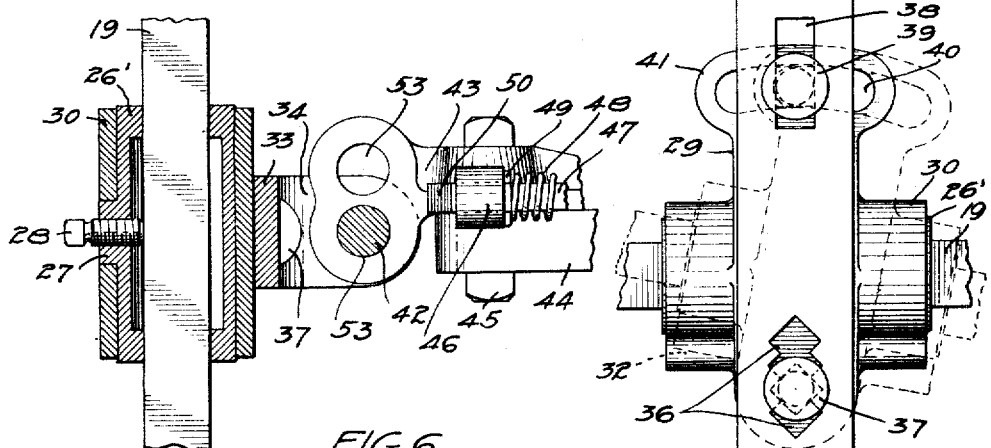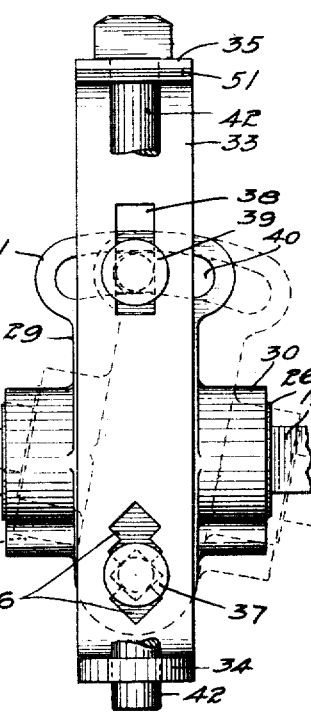

SPENCER H. PHELPS, OF MINNEAPOLIS, MINNESOTA, ASSIGNOR TO BEEMAN GARDEN TRACTOR CO., OF MINNEAPOLIS, MINNESOTA, A CORPORATION.

PLOW-HITCH FOR WALKING-TRACTORS.

1,308,445.  Specification of Letters Patent.  Patented July 1, 1919.

Application filed April 27, 1918. Serial No. 231,243.

*To all whom it may concern:*

Be it known that I, SPENCER H. PHELPS, a citizen of the United States, resident of Minneapolis, county of Hennepin, State of Minnesota, have invented certain new and useful Improvements in Plow-Hitches for Walking-Tractors, of which the following is a specification.

The object of my invention is to provide a means for coupling a plow beam to a traction machine in such a manner that one wheel of the tractor may run in the furrow without affecting the draft of the plow and the plow beam may be raised so that the plow point will run out of the ground and be held in such raised position until such time as the operator desires to resume the plowing operation.

A further object is to provide a hitch device that is capable of rocking forward or backward to accommodate itself to the movement of the beam and the caster wheels in following the inequalities of the ground.

The invention consists generally in various constructions and combinations, all as hereinafter described and particularly pointed out in the claims.

In the accompanying drawings forming part of this specification,

Figure 1 is a plan view of a portion of a tractor, showing my improved plow hitch mounted thereon, Fig. 2 is a side elevation, partially in section of the same, Fig. 3 is a transverse sectional view with the handle bars removed, showing the manner of mounting the hitch when the traction wheels are on the same level, Fig. 4 is a similar view, showing the position of the hitch when one of the traction wheels is running in the furrow, Fig. 5 is a detail view of the hitch, showing the manner of mounting it on a draft bar of the machine, Fig. 6 is a detail sectional view, showing the means for mounting the hitch on the draft bar, Fig. 7 is a rear elevation of the hitch, the draft bolt to which the plow beam is attached being broken away to illustrate the means for adjusting the hitch yoke for the purpose of changing the angle of the draft bolt, Fig. 8 is a transverse sectional view through the steering posts, looking toward the machine, Fig. 9 is a detail sectional view, showing the manner of mounting the posts on the frame for rotary movement.

In the drawing, 2 represents the frame of the machine, having carrying and traction wheels 3 and an internal combustion engine 4, of suitable type, mounted thereon. The frame of the machine is provided with lugs 5 and 6 to which a casting 7 is secured by means of pins 8. In this casting a rearwardly projecting stud 9 is mounted. A yoke 10 has a sleeve 11 thereon to receive the stud 9 on which the said yoke is free to rock but is limited in its movement by a pin 12 which projects into a slot in said sleeve and by a lug 14 which engages a recess in the casting 7. The outwardly projecting arms 16 of the yoke 10 have vertical sockets therein to receive bolts 17 which pass through the arms 18 in which a cross bar 19 is mounted. Similar arms 18ª are adjustably mounted on the cross bar and have rods 20 pivoted therein on which steering wheels 21 are mounted. The steering posts 22 are mounted for rotation in a casting 23 that is pivoted at 24 on the casting 7. These steering posts are provided with the usual handles 25. The casting 23 has a recess therein for a guide 26, see Fig. 1, and a spring 27 normally holds the casting and the steering posts in a raised position. The steering posts 22 fit within sockets in the casting 23 and collars 23' are secured on said posts within said sockets by set screws 23''. These collars serve to hold the posts in place in their sockets while permitting them to rock and shift the ground-working implements from side to side, the connections with such implements operating to limit suitably the rocking or rotary movement of the posts. Clamping screws 23ª are also provided by means of which the posts may be rigidly secured in their sockets and held against rotary movement on a longitudinal axis in case it should be desired to operate the machine without making use of the feature of shifting the ground-working implements laterally. So far the mechanism described is shown in the Beeman and Peters application filed December 10, 1917, Serial No. 206,465.

My present invention distinguishes particularly from the one referred to above in utilizing the steering posts for raising the plow beam or other ground-working implement having a beam to a point where it may be locked in a raised position so that the point of the plow will be out of the ground and forcing the plow beam when unlocked downwardly to direct the point of the plow into the ground.

Referring now to Fig. 5, the bar 19 which is rectangular in cross section, has a sleeve 26' slidable thereon and provided with a boss 27 on one side in which a set screw 28 is mounted. By means of this screw the sleeve may be rigidly clamped on the bar 19. A bracket 29 has a hub 30 in which the sleeve 26' is mounted to rotate and said hub has a transverse slot 31 on one side to receive the boss 27, a longitudinal opening 32 in the wall of the hub communicating with the slot 31 and allowing the insertion of the sleeve within the hub and its rotation therein to enter the boss in the slot 31. This construction allows the adjustment of the bracket back and forth on the bar 19 to desired draft position and also allows oscillation of the bracket on the sleeve 26' to provide flexibility of the connection between the plow beam and the frame and permit the beam to rise and fall with the movement of the machine over the ground. A yoke 33 has forwardly projecting end portions 34 and 35 in substantially parallel relation and the lower portion of the yoke is provided with a plurality of rectangular openings 36 therein, preferably arranged, as shown in Fig. 7, in intersecting relation to receive a bolt 37 which may be inserted into either one of the openings for the purpose of securing the lower end of the yoke to the lower portion of the bracket 29. The bolt 7 is shifted in the openings 36 to obtain the desired vertical adjustment of the yoke, and the distance of the plow beam from the ground to regulate the depth of plowing. The upper portion of the yoke has a longitudinal slot 38 therein and a bolt 39 passes through this slot and through a curved slot 40 provided in the upper portion of a web 41 which is formed on the bracket 29 and projects upwardly therefrom. When this bolt is loosened, the yoke may be moved back and forth in the slot 40 to adjust it for the desired angle with respect to the ground line. For instance, referring to Figs. 3 and 4, the yoke in the former figure is shown in a vertical position, with both traction wheels on the same level. In Fig. 4 one of the traction wheels is running in a furrow and the yoke device is shifted to one end of the slot 40 so that it is still in an upright position, although the draft bar 19 is inclined to the furrow side of the machine. In the parallel end portions 34 and 35 I mount an upright draft bolt 42 and on this draft bolt a clevis plate 43 is vertically slidable. The plow beam 44 is secured to this clevis by suitable means, such as bolts 45 fitting within openings provided in the beam. The clevis plate is vertically adjustable on the beam, as indicated in Fig. 5, and provided with an additional means for regulating the height of the plow beam and the depth of the furrow. The top of the clevis has ears 46 formed theron in which a bolt 47 is mounted to slide and carries a compression spring 48 between one of said ears and a pin 49 mounted in the bolt. The forward end is beveled, as at 50, to engage a corresponding surface 51 formed on the end of the yoke 35 so that when the bolt contracts with this surface it will be pushed backwardly against the compression of its spring to clear the end of the yoke, and when the bolt is above the yoke, its spring will project it forward to the position indicated by dotted lines in Fig. 5 and thereupon the flat under surface of the bolt will rest upon the end 35 and support the clevis and the plow beam in their raised position. The plow will then assume the position shown by dotted lines in Fig. 2, where it will run out of the ground with further forward movement of the machine and will continue to run on the surface as long as the clevis and the beam are in their raised position.

The bolt 47 has a flexible operating means 52 attached thereto and extending up to a point near the handle bars where the operator can grasp it and move the bolt against the tension of the spring 48 to release the clevis and allow the plow beam to drop to the lower end of the draft bolt 42. The clevis is preferably provided with a plurality of sockets 53 therein for the bolt 42 so that lateral adjustment of the clevis and plow beam is permitted. I also provide bars 54 connected at their lower ends to a U-shaped bar 55 secured to the plow beam by a clevis 55' and having adjustable connections at 56 with second bars 57 which are secured to the clamps 58 on the steering posts so that when the posts are lifted the plow beam will be raised also to engage its locking bolt with the upper end of the yoke. The bars 54 and 57 are capable of relative adjustment to obtain the desired length of stroke in the vertical movement of the beam. See Fig. 8.

In the operation of the machine, the hitch is set at the desired angle to the ground line and upon releasing the locking bolt the clevis and beam will drop by gravity from the raised position to the full line position shown in Fig. 5 in position to enter the soil and turn the furrow. The steering of the machine will be accomplished by the manipulation of the steering posts, as heretofore described. The hitch allows the plow beam to rock vertically as the plow moves through the soil and the angle of the hitch to the ground line may be varied so that the traction wheels may run on the same level or one of them in the furrow without affecting the operation of the plow itself.

Whenever desired, the operator may raise the steering posts and lift the beam of the plow or other ground-working implement to the dotted line position in Fig. 5 and the latch will automatically lock the beam in this position and the point of the plow will be guided out of the soil. The implement may then be shifted laterally by rotary movement of the posts and when the position is reached where the operator desires to resume plowing, the locking latch may be tripped, the beam will drop by gravity to the lower end of the yoke on which the beam clevis is mounted, and then, by exerting a downward pressure on the steering posts, the point of the plow or other implement will be directed into the soil until the desired plowing depth is reached. While the plow is running in the soil, the operator, by exerting a downward and lateral pressure on the steering posts, may utilize the implement as a fulcrum for oscillating the traction wheels on a vertical axis to guide the machine.

I claim as my invention:

1. A machine of the class described comprising in combination a frame having carrying wheels, a steering device connected with said frame and having a vertical movement thereon, a ground-working implement having a beam connected with said frame for vertical movement thereon, means connecting said steering device with said beam for raising it to guide said implement out of the ground when said steering device is lifted and for forcing said beam downwardly to guide said implement into the ground when said steering device is depressed downward and lateral pressure on said steering device oscillating said wheels on a vertical axis to guide the machine.

2. A machine of the class described comprising in combination a frame having carrying wheels, a steering device connected with said frame and having a vertical movement thereon, a ground-working implement having a beam connected with said frame for vertical movement thereon, means connecting said steering device with said beam for raising it to guide said implement out of the ground when said steering device is lifted and for forcing said beam downwardly to guide said implement into the ground when said steering device is depressed, and means for locking said beam in its raised position downward and lateral pressure on said steering device oscillating said wheels on a vertical axis to guide the machine.

3. A machine of the class described comprising in combination a frame having carrying wheels, a steering device connected with said frame and having a vertical movement thereon, a ground-working implement having a beam connected with said frame for vertical movement thereon, means connecting said steering device with said beam for raising it to guide said implement out of the ground when said steering device is lifted and for forcing said beam downwardly to guide said implement into the ground when said steering device is depressed, means for locking said beam in its raised position, and a trip device for said locking means extending to said steering device.

4. A machine of the class described comprising in combination a frame having carrying wheels, a steering device connected with said frame for vertical movement thereon, a ground-working implement having a beam connected with said frame for vertical movement, means connecting said beam to said steering device for lifting said beam to guide said implement out of the ground when said steering device is raised and for guiding said implement into the ground when said steering device is depressed, a latch for locking said beam in its raised position, and a tripping means connected with said latch and extending to said steering device.

5. A machine of the class described comprising in combination a frame having carrying wheels, a steering device connected with said frame for movement vertically thereon, a ground-working implement having a beam, a yoke connected with said frame and a clevis mounted on said beam and slidable vertically in said yoke, means connecting said beam with said steering device for lifting said beam to guide said implement out of the ground when said steering device is raised and for forcing said beam downwardly to direct said implement into the ground when said steering device is depressed.

6. A machine of the class described comprising in combination a frame having carrying wheels, a steering device connected with said frame for movement vertically thereon, a ground-working implement having a beam, a yoke connected with said frame and a clevis mounted on said beam and slidable vertically in said yoke, means connecting said beam with said steering device for lifting said beam to guide said implement out of the ground when said steering device is raised and for forcing said beam downwardly and directing said implement into the ground when said steering device is depressed, means for automatically locking said beam when raised and means extending to said steering device for tripping said locking means.

7. The combination, with a frame and supporting means therefor, of a cross bar, polygonal in cross section, a sleeve slidable on said cross bar, a bracket having a hub mounted to rotate on said sleeve, a yoke connected with said bracket, a draft bolt mounted in said yoke to rock therewith on said sleeve, and a ground-working implement clevis loosely mounted on said draft bolt.

8. A machine of the class described comprising in combination a frame having carrying wheels, a steering device connected with said frame for vertical movement thereon, a yoke mounted for rotary movement on said frame, a bar transversely mounted in said yoke, caster wheels having bearings on said bar and following said carrying wheels, a clevis mounted on said bar for adjustment laterally thereon, a ground-working implement having a beam connected with said clevis for vertical movement and means connecting said beam with said steering device for lifting said beam when said steering device is raised and forcing said beam downwardly when said steering device is depressed.

9. The combination, with a machine frame and a steering post projecting rearwardly therefrom, of a yoke connected with said frame, a draft bolt carried by said yoke, a beam clevis vertically slidable on said draft bolt, means for locking said clevis on said bolt in its raised position, and means extending to said steering post for tripping said locking means.

10. The combination, with a machine frame and a steering post projecting rearwardly therefrom, of a yoke connected with said machine, a draft bolt mounted in said yoke, a ground-working implement having a clevis slidable on said bolt, means connecting the beam of said ground-working implement with said steering post for raising said beam with the upward movement of said post, a locking device for holding said beam and clevis in their raised position, and means for tripping said locking device.

11. The combination, with a frame having carrying wheels and a steering post extending rearwardly therefrom and mounted for vertical oscillation, of a draft attachment connected with said frame, a ground-working implement beam mounted for vertical movement in said draft connection, means connecting said steering post with said beam for raising it with the upward movement of said post, a bolt for locking said beam at the limit of its upward movement in said draft connection, and means for tripping said bolt extending to said steering post.

12. A machine of the class described comprising a frame having carrying wheels, a steering device mounted on said frame for vertical movement thereon, a draft yoke connected with said frame and a bolt mounted therein, a ground-working implement having a beam, a clevis mounted on said beam and vertically slidable on said bolt, a spring-actuated bolt slidably mounted on said clevis and having a beveled end to slip past said yoke when said clevis is raised to engage said yoke and lock said clevis in its raised position, means connecting said beam and said steering device for lifting said beam when said steering device is raised, and means for tripping said bolt to release said beam.

13. A machine of the class described comprising a frame having carrying wheels, a steering device mounted on said frame for vertical movement thereon, a draft bar transversely mounted on said frame, a bracket carried by said draft bar and having an upwardly projecting web, a yoke mounted for vertical adjustment on said bracket and for lateral adjustment in a vertical plane on said web, a ground-working implement having a beam, a clevis mounted on said beam and vertically slidable in said yoke, and means connecting said steering device and said beam.

14. A machine of the class described comprising a frame having carrying wheels, a steering device mounted for vertical movement on said frame, a draft bar connected with said frame, a bracket mounted thereon and provided with an upwardly projecting web having a transverse opening therein, a bolt mounted in the lower portion of said bracket, a yoke mounted on said bolt for oscillation therewith, a second bolt passing through the upper portion of said yoke and through the opening in said web for adjusting said yoke in a vertical plane at an angle to said bracket, a draft bolt carried by said yoke, a ground-working implement having a beam, a clevis mounted on said beam and vertically slidable on said draft bolt, and means connecting said beam with said steering device.

15. A machine of the class described comprising a frame having carrying wheels, a steering device mounted on said frame for vertical movement thereon, a draft bar transversely mounted in said frame, a bracket mounted for adjustment in said draft bar, a yoke carried by said bracket, a draft bolt mounted in said yoke, a ground-working implement having a beam, a clevis mounted on said beam and having freedom of vertical movement on said bolt and provided with a plurality of openings therein for adjustment laterally on said bolt and means connecting said beam and said steering device.

16. The combination, with a frame and carrying wheels therefor, of steering posts mounted in parallel relation for rotary movement on a longitudinal axis in said frame, a ground-working implement having a draft beam, draft connections between said beam and said frame, a U-shaped bar secured to said beam and projecting laterally under said steering posts, and connections rigidly mounted on said posts and pivotally attached at their lower ends to said bar.

17. The combination, with a frame and carrying wheels therefor, of steering posts mounted in parallel relation for rotary movement on a longitudinal axis in said frame, a ground-working implement having a draft beam and draft connections between said beam and said frame, a bar projecting laterally from said beam beneath said steering posts, and connections rigidly mounted on said posts and pivotally connected to said bar, rocking of either of said posts moving said bar and draft beam laterally.

18. The combination, with a frame and carrying wheels therefor, of a steering post mounted for rotary movement on a longitudinal axis in said frame, a ground-working implement having a draft beam, a draft connection between said beam and said frame, a bar secured to said beam and projecting laterally therefrom, and a connecting bar mounted on said post for rotary movement therewith and having a pivotal connection with said laterally extending bar.

19. A machine of the class described comprising a frame having carrying wheels, a steering post mounted on said frame for vertical movement thereon, a ground-working implement having a beam connected with said frame for vertical movement, said beam having a laterally extending member thereon and a bar mounted on said post and pivotally connected to said member, upward movement of said post lifting the forward portion of said beam and downward movement of said post depressing said beam.

20. A machine of the class described comprising in combination a frame having carrying wheels, a steering device connected with said frame, a yoke connected with said frame for lateral oscillation thereon, a ground-working implement having a beam connected with said yoke for vertical movement therein, the lateral oscillation of said yoke allowing one of said wheels to run in a furrow and the other on the land without affecting the position of said implement, and means connecting said beam with said steering device for raising said beam to guide said implement out of the soil when said steering device is lifted and for forcing said beam downwardly to guide said implement into the soil when said steering device is depressed.

21. A machine of the class described comprising a frame having carrying wheels, a yoke mounted for rotary movement on said frame, a ground-working implement connected with said yoke, a steering post connected with said frame for vertical movement thereon, and means connecting said steering post with said implement.

22. A machine of the class described comprising a frame having carrying wheels, a yoke mounted for rotary movement on said frame, a ground-working implement having a beam connected with said yoke, a pair of steering posts mounted on said frame in parallel relation for vertical movement thereon, and means connecting said posts with said beam for lifting or depressing said beam and implement.

23. A machine of the class described comprising in combination a frame having supporting means, a pair of steering posts, spaced apart, and mounted on said frame for vertical movement, a ground-working implement having a beam connected with said frame for vertical movement thereon and means connecting said beam with said posts for lifting said beam and implement when said posts are raised and depressing said beam to guide said implement into the soil when said posts are depressed.

24. A machine of the class described comprising in combination a frame having carrying wheels, a steering device connected with said frame for movement vertically thereon, a yoke connected with said frame and mounted for lateral adjustment thereon for movement of said yoke toward or from the plane of one of said wheels, a ground-working implement having a beam connected with said yoke for lateral adjustment therewith, said beam having a vertical movement on said yoke and means connecting said beam with said steering device for lifting said beam to guide said implement out of the soil when said steering device is raised and for forcing said beam downwardly to direct said implement into the soil when said steering device is depressed.

25. A machine of the class described comprising in combination a frame having carrying wheels, a steering device connected with said frame, a yoke connected with said frame for rotary movement thereon, a ground-working implement having a beam connected with said yoke, the rotary movement of said yoke allowing said beam and implement to move in an upright position through the soil when one of said carrying wheels is running in the furrow, and means connecting said steering device and said beam for lifting and depressing said beam and implement.

26. A machine of the class described comprising a frame having carrying wheels, a steering post connected with said frame for vertical movement thereon, a ground-working implement having a beam connected with said frame for vertical movement, a bar rigidly mounted on said post and having a pivotal connection with said beam, upward movement of said steering post lifting the forward portion of said beam to guide said implement out of the ground and downward movement of said post depressing said beam to direct said implement into the ground.

27. A machine of the class described comprising a frame having carrying wheels, a pair of steering posts mounted in parallel relation on said frame for vertical movement thereon, a ground-working implement having a beam connected with said frame for vertical movement, bars rigidly connected with said posts respectively and having pivotal connections with said beam for raising and lowering said beam with the upward and downward movement of said posts.

28. A machine of the class described comprising a frame having carrying wheels, a steering post connected with said frame for vertical movement thereon, a ground-working implement connected with said frame and having a vertical movement, means connecting said ground-working implement with said steering post for lifting said implement when said post is raised and guiding said implement into the ground when said post is depressed.

29. A machine of the class described comprising a frame having carrying wheels, a pair of steering posts mounted in parallel relation and connected with said frame for vertical movement, a ground-working implement connected with said frame and having a vertical movement and means connecting said posts with said ground-working implement for raising said implement when said posts are raised and depressing said implement when said posts are lowered.

30. A machine of the class described comprising in combination a frame having carrying wheels, a pair of steering posts arranged in parallel relation and each mounted in said frame for rotary movement on its longitudinal axis and also having a vertical movement on said frame, a ground-working implement having a connection with said frame for vertical movement with respect thereto and means connecting said implement with said posts for raising and depressing said implement to guide it out of or into the ground with the vertical movement of said posts downward and lateral pressure on said posts oscillating said wheels on a vertical axis to guide the machine.

31. A machine of the class described comprising in combination a frame having carrying wheels, a pair of steering posts arranged in parallel relation and each mounted in said frame for rotary movement on its longitudinal axis, and also having a vertical movement with respect to said frame, a ground-working implement having a beam connected with said frame for vertical movement thereon, means connecting said beam with said posts for raising and depressing said beam to guide said implement out of the soil or direct it into the soil with the vertical movement of said posts downward and lateral pressure on said posts oscillating said wheels on a vertical axis to guide the machine.

In witness whereof I have hereunto set my hand this 8th day of April, 1918.

SPENCER H. PHELPS.

Copies of this patent may be obtained for five cents each, by addressing the "Commissioner of Patents, Washington, D. C."